United States Patent [19]
Junqua

[11] Patent Number: 5,677,990
[45] Date of Patent: Oct. 14, 1997

[54] SYSTEM AND METHOD USING N-BEST STRATEGY FOR REAL TIME RECOGNITION OF CONTINUOUSLY SPELLED NAMES

[75] Inventor: Jean-claude Junqua, Santa Barbara, Calif.

[73] Assignee: Panasonic Technologies, Inc., Princeton, N.J.

[21] Appl. No.: 435,881

[22] Filed: May 5, 1995

[51] Int. Cl.[6] ............................................. G10L 5/00
[52] U.S. Cl. .................. 395/2.64; 395/2.6; 395/2.61; 395/2.79
[58] Field of Search ............................. 395/2, 2.4, 2.56, 395/2.58, 2.6, 2.64, 2.63, 2.65, 2.84, 2.61, 2.79; 379/67, 88, 89

[56] References Cited

U.S. PATENT DOCUMENTS

| | | | |
|---|---|---|---|
| 4,742,547 | 5/1988 | Watanabe | 395/2.5 |
| 4,748,670 | 5/1988 | Bahl et al. | 395/2.65 |
| 4,831,550 | 5/1989 | Katz | 381/43 |
| 5,241,619 | 8/1993 | Schwartz et al. | 395/2 |
| 5,268,990 | 12/1993 | Cohen et al. | 395/2 |
| 5,454,063 | 9/1995 | Rossides | 395/2.84 |
| 5,467,425 | 11/1995 | Lau et al. | 395/2.52 |
| 5,502,791 | 3/1996 | Nishimura et al. | 395/2.65 |

OTHER PUBLICATIONS

"The N-Best Algorithm: An Efficient and Exact Procedure for Finding the N Most Likely Sentence Hypotheses", R. Schwartz et al., IEEE, pp. 81-84 Dec. 1990.

"A Tree Trellis Based Fat Search for Finding the N Best Sentence Hypotheses in Continuous Speech Recogntion", F.K. Soong et al., IEEE, pp. 705-708 Dec. 1991.

"An Algorithm of High Resolution and Efficient Multiple String Hypothesization for Continuous Speech Recognition Using Inter-Word Models", W. Chou et al., IEEE, pp. II-153 to II-156 Dec. 1994.

Schwarz, R. and Austin, S., *Efficient, High-Performance Algorithms for N-Best Search*, BBN Systems and Technologies Inc., 10 Moulton St., Cambridge, MA 02138, pp. 6-11 Jun. 1990.

Cole, R.; Roginski, K.; Fanty, M., *English Alphabet Recognition With Telephone Speech*, Oregon Graduate Institute of Science and Technology, 19600 N.W. Von Neumann Dr., Beaverton, OR 97006, pp. 479-482 date unknown.

Hermansky, H. et al., *Compensation for the Effect of the Communication Channel in Auditory-Like Analysis of Speech (RASTA-PLP)*, U.S. West Advanced Technologies, 4001 Discovery Drive, Boulder, CO 80303, pp. 1367-1370 date unknown.

Damashek, M. "Gauging Similarity With n-Grams: Language-Independent Categorization of Text," *Science*, vol. 267, Feb. 10, 1995, pp. 843-848.

Mari, J. And Haton, J. "Automatic Word Recognition Based on Second-Order Hidden Markov Models," *ICSLP 94*, Yokohama, CRIN/CNRS & INRIA-Lorraine, BP 239 54506 Vandoeuvre-Lés Nancy, France, pp. 247-250 (S07-16.1:S07-16.4).

Murveit, H. et al. *Reduced Channel Dependence for Speech Recognition*, SRI International, Speech Research & Technology Program, Menlo Park, CA 94025, pp. 280-284 date unknown.

(List continued on next page.)

*Primary Examiner*—Krista M. Zele
*Assistant Examiner*—Scott L. Weaver
*Attorney, Agent, or Firm*—Harness, Dickey & Pierce P.L.C.

[57] ABSTRACT

A multipass recognition strategy selects the N-best hypotheses resulting from each pass and propagates these N-best to the next pass. This strategy outperforms conventional hidden Markov model recognizers using a grammar constraining all possible names. Real time recognition of continuously spelled names is made feasible, in part, because the processor-intensive costly constraints are applied, if at all, in the 4th pass, after the system has produced a much smaller dynamic grammar.

12 Claims, 10 Drawing Sheets

OTHER PUBLICATIONS

Cole R. et al., "Speaker–Independent Name Retrieval From Spellings Using a Database of 50,000 Names," *IEEE* 1991, S5.19, pp. 325–328 Dec. 1994.

Junqua, J. et al., *An N–Best Strategy, Dynamic Grammars and Selectively Trained Neural Networks for Real–Time Recognition of Continuously Speled Names Over the Telephone*, Speech Technology Laboratory, Panasonic Technologies, Inc. 3888 State Street, Santa Barbara, CA 93105, CRIN–CNRS & INRIA Lorraine, BP 239–F54506 Vandoeuvre Lés nancy, france; Institut Eurécom, BP 193–06904 Sophia Antipolis cédex, france May 12, 1995.

*HTK: Hidden Markov Model Toolkit V1.4 Installation Guide, User Manual, Reference Manual, Programmer Manual,* Cambridge University Engineering Department, Speech Group, P.C. Woodland, Oct. 2, 1992.

Naadeu, C. et al. "Filtering of Spectral Parameters for Speech Recognition," *ICSLP* 94, Yokohama, AT&T Bell Laboratories, Murray Hill, NJ 07974, pp. 1927–1930 (S31–24.1:S31–24.4) Dec. 1994.

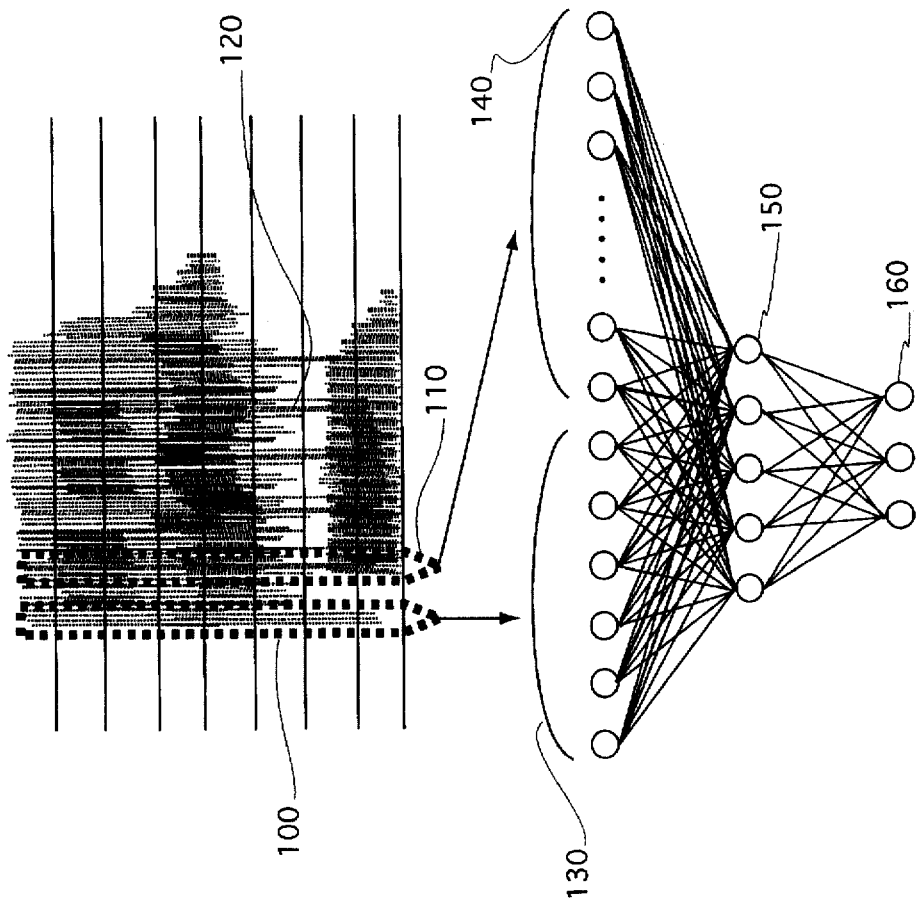
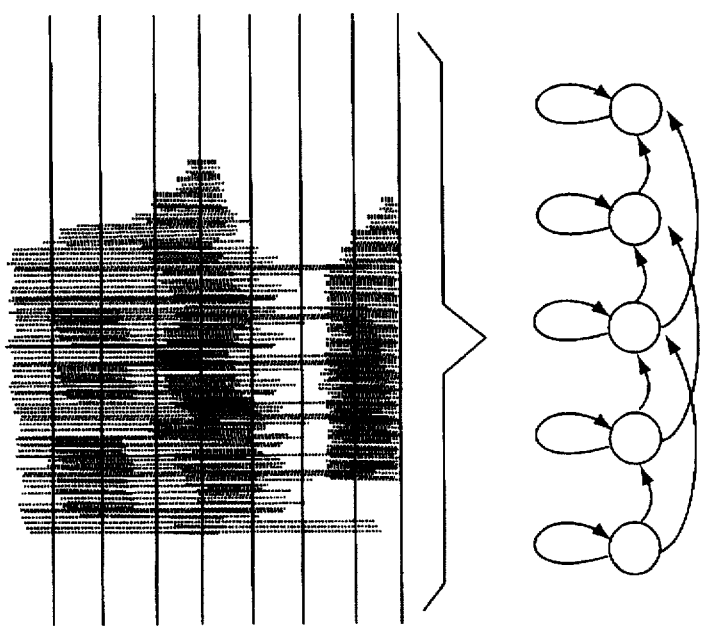
FIGURE 7B
FIGURE 7A

Ex: One Frame for the [A, J, K] Subset

SYSTEM AND METHOD USING N-BEST STRATEGY FOR REAL TIME RECOGNITION OF CONTINUOUSLY SPELLED NAMES

BACKGROUND AND SUMMARY OF THE INVENTION

The present invention relates generally to speech recognition systems. More particularly, the invention relates to a system and method for recognizing continuously spelled names that are input as a sequence of letters uttered into a microphonic transducer. The invention may be used, for example, in automated telephone directory lookup systems.

Automatic speech recognition of spelled names is a difficult task. The alphabet contains many letters that sound confusingly alike, particularly when spoken through a telephone handset, or the like. The telephone channel introduces distortions that for the most part are unpredictable. In addition, the bandwidth of conventional telephone systems is limited. This results in a loss of some high frequency information that contains important information useful in discriminating one letter from another.

Of course, in many applications the spelled names belong to a fixed list and knowledge of this list can be used to aid the recognition process by applying constraints on the sequence of letters that are possible. A telephone directory containing a list of names is one example of such a list.

However, knowing the sequence of possible letters by relying on prior knowledge of the list has its limitations. In a speech recognition system there is uncertainty in the identity of each and every letter. Thus, just because the first letter in a name is interpreted by the speech recognizer as the letter J, this does not mean that names beginning with letters other than J can be necessarily excluded. The speech recognizer may have falsely interpreted the utterance as the letter J, when in fact the utterance was the letter G. Thus, knowledge of the list of names, while helpful, cannot be relied upon in the same way as a tree-structured concordance table would be relied upon in a text-based (keyboard entry) dictionary lookup system.

Indeed, speech recognition of continuously spelled names is, in many respects, more difficult than the more general task of continuous speech recognition. Recognition of spoken letters is even difficult for humans, particularly over a noisy or limited bandwidth communication channel. This is why radio telephone operators are trained to use a phonetic alphabet, A-Alpha, B-Baker, C-Charlie, etc., when communicating over a noisy channel.

In addition, while reasonable recognition accuracy can be obtained using a conventional speech recognizer constrained on the sequence of possible letters by the known list, response time increases quite dramatically as the size of the list or dictionary increases.

There are a number of potential consumer applications that would benefit from a recognizer for continuously spelled names. However, all but the simplest of these applications is rendered impractical by processor response time. The present invention overcomes this problem. The invention performs a series of separate speech recognition processes, each process extracting and propagating the N-best hypotheses. To attain an optimally short response time, the processes are performed first without costly constraints and thereafter with costly constraints, if needed, after the number of word candidates is low.

According to one aspect of the invention, the speech recognition process provides an n-gram letter grammar that defines a plurality of groups of letters. The presently preferred embodiment uses a bigram letter grammar (couplets of letter pairs) although trigram letter grammars and larger letter grammars may also be used.

The sequence of letters uttered into a microphonic transducer (such as a telephone handset) are processed through a speech recognizer that uses the n-gram letter grammar to produce a first list that comprises a plurality of groups of letters representing the N-best hypotheses. (N may be any number greater than one.). Next, a name dictionary comprising a plurality of names representing possible choices is provided and alignment is performed between the first list and the name dictionary. By this alignment a plurality of names representing the N-best candidates is selected from the name dictionary.

Having selected the N-best candidates, these candidates are used to build a dynamic grammar. With this dynamic grammar in place, the sequence of letters uttered into the microphonic transducer is then processed a second time through a speech recognizer. This time, however, the speech recognizer uses the dynamic grammar built in the previous step instead of the letter grammar. From this dynamic grammar one candidate is selected as the best hypothesis for the continuously spelled name. If desired, the second speech recognizer process may be highly constrained without significant processor time penalty. Although costly constraints may be applied, the dynamic grammar is small compared to the entire name dictionary.

For a more complete understanding of the invention, its objects and advantages, reference may be had to the following specification and to the accompanying drawings.

BRIEF DESCRIPTION OF THE DRAWINGS

FIG. 7A and 7B (collectively FIG. 7) are spectrograms comparing the whole word global method of HMM recognition (FIG. 7A) with the discriminative part neural network recognition (FIG. 7B);

DESCRIPTION OF THE PREFERRED EMBODIMENT

Figure 1:
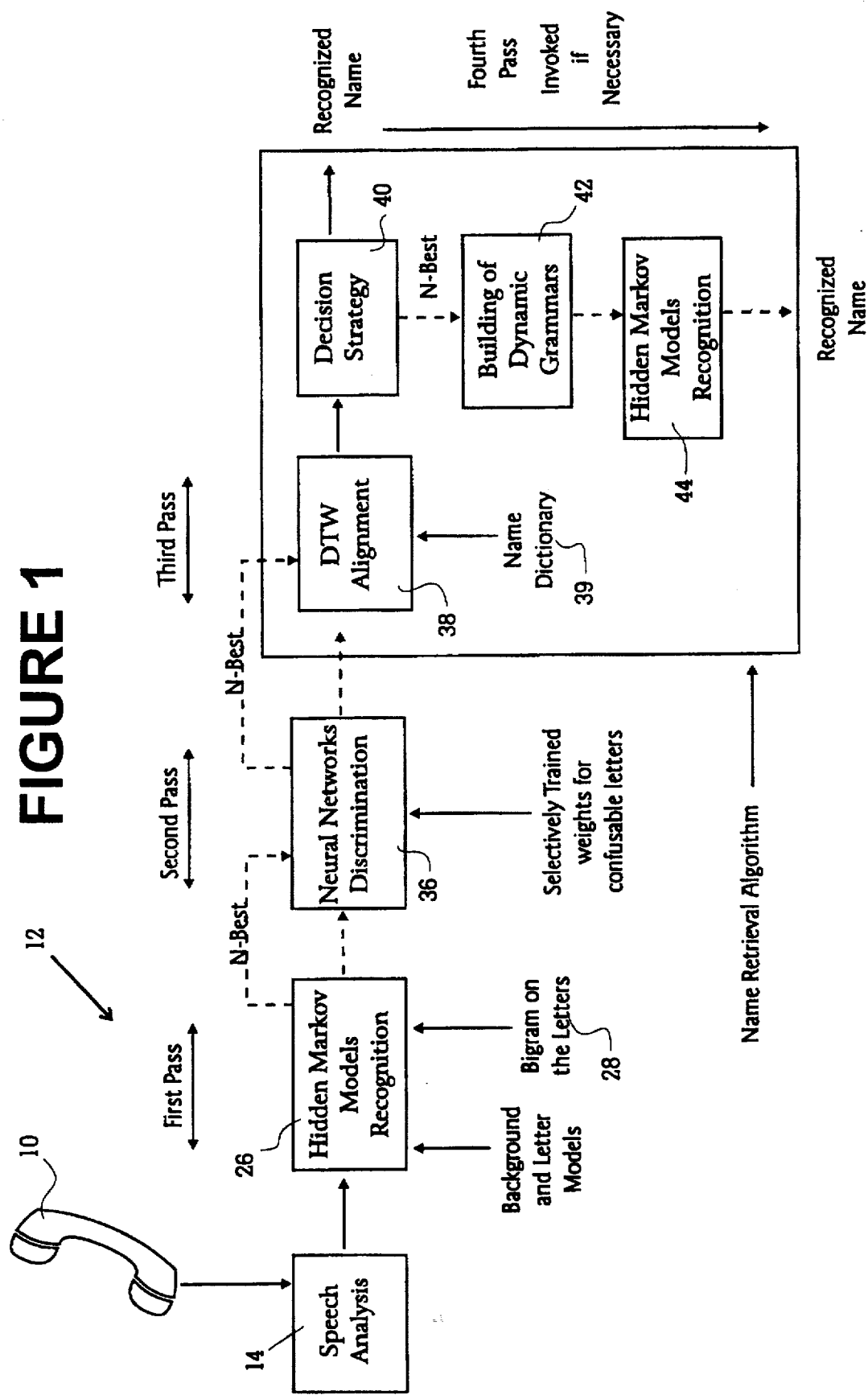
FIG. 1 is a block diagram of the recognition system of the invention.

Referring to FIG. 1, continuously spelled names comprising a sequence of letters are supplied to the recognition system by any suitable means. For purposes of illustration an analog microphonic transducer, such as a telephone handset, is illustrated as the input device. Of course, the invention is not limited to telephone applications, but may be applied to wide range of different systems and consumer products. The microphonic transducer is depicted generally at 10 and the recognition system is depicted generally at 12.

Figure 2:
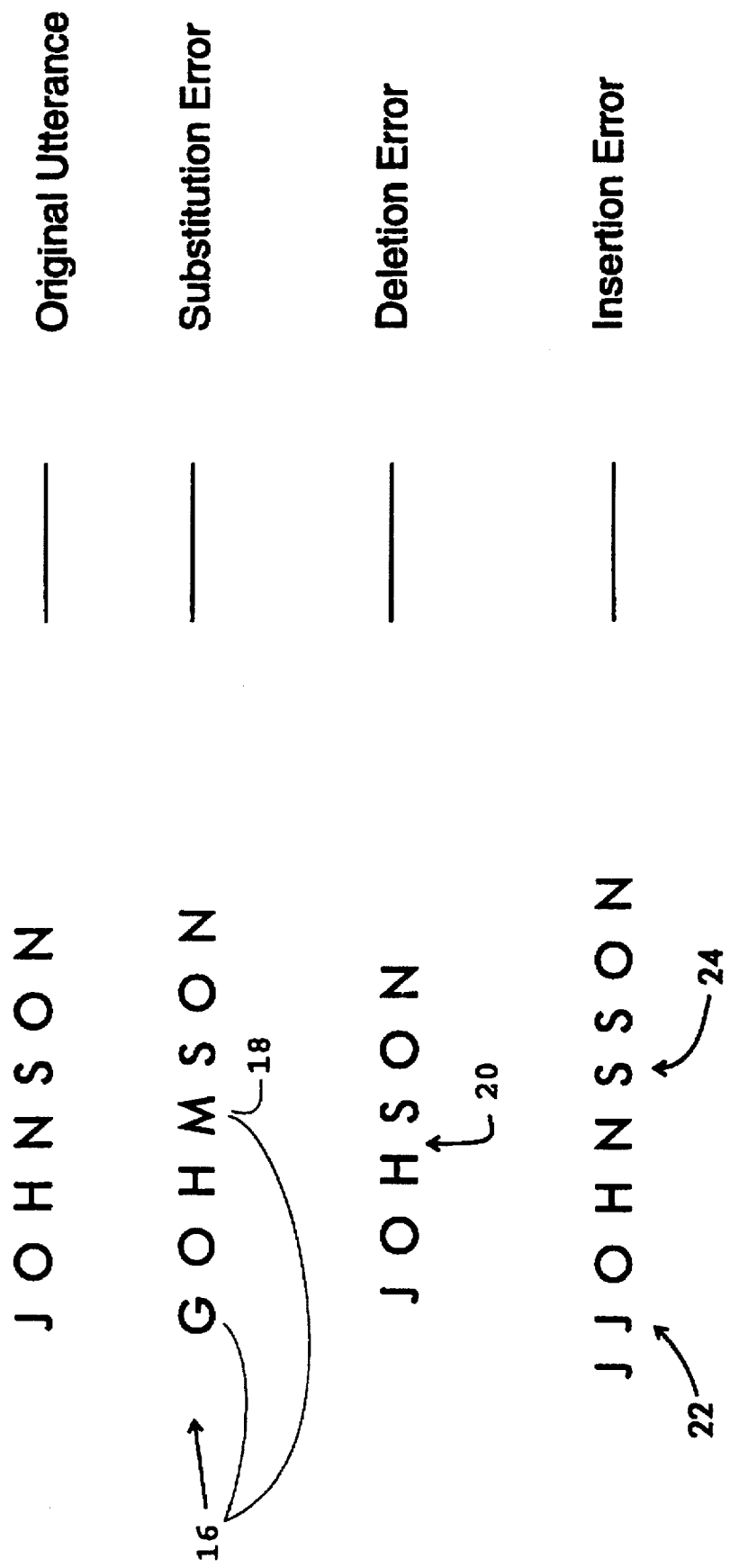
FIG. 2 illustrates, by example, different types of recognition errors.

The recognition system comprises a collection of processing modules that will now be described. Receiving the input sequence of letters is the speech analysis module 14. This module performs front end optimization designed to decrease the number of substitution, deletion and insertion errors. In a continuously spelled name a substitution error is the substitution of an incorrect letter for the correct one. FIG. 2 illustrates at 16 and 18 examples of substitution errors made in the recognition of the spelled name JOHNSON. A deletion error is the omission of one or more letters from the continuously spelled name. This is illustrated at 20 in FIG. 2. An insertion error is the inclusion of additional letters not originally uttered in the continuously spelled name. An example of an insertion error is shown at 22 and 24 in FIG. 2.

The speech analysis module 14 is designed to operate on digitized speech data. Thus if an analog speech input system is used, the analog signal should first be digitized. This may be done by suitable analog-to-digital circuitry that may be included in the speech analysis module 14.

The presently preferred speech analysis module uses an 8th-order PLP-RASTA process to compensate for the effect of the communication channel. For more information regarding the PLP-RASTA compensation, see H. Hermansky, N. Morgan, A. Bayya and P. Kohn, *EUROSPEECH* '91, pages 1367–1370, 1991. The presently preferred embodiment uses a 10 millisecond frame shift and a 20 millisecond analysis window. The RASTA filter coefficient is optimized to decrease the number of substitution, deletion and insertion errors. The best filter coefficient compromise is selected for a value of 0.90.

Figure 3:
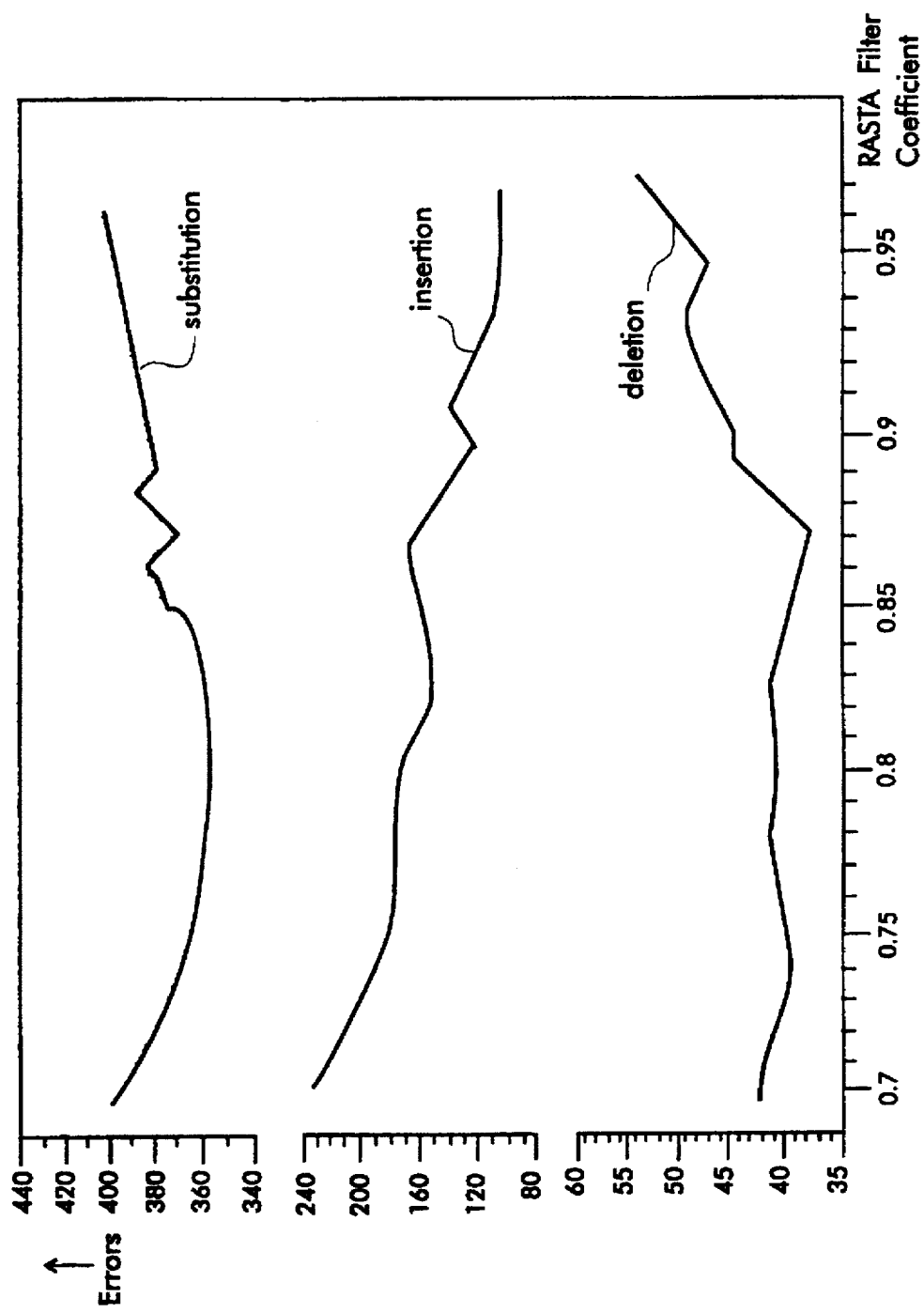
FIG. 3 is a graph showing optimization of the PLP-RASTA filter coefficients to decrease the number of substitution, deletion and insertion errors.

In determining the optimized RASTA filter coefficients, the energy, the first derivative of the energy and the first derivative of the static cepstral coefficients $C_1$ through $C_8$ (computed over 7 frames) are alternatively combined with the static cepstral coefficients to form the speech parametric representation (a total of 18 coefficients). FIG. 3 illustrates the optimized RASTA filter coefficients that will decrease the number of substitution, deletion and insertion errors. In this figure PLP-RASTA stands for the combination of energy, the first derivative of energy, static cepstral coefficients and first derivative of static cepstral coefficients.

While the PLP-RASTA optimization is presently preferred, other forms of optimization may also be used. For example, an MFCC analysis may alternatively be used. Suitable results can be obtained using a 14th-order MFCC analysis. For the MFCC analysis, 11 static cepstral coefficients ($C_0$ included) are computed with a frame shift of 16 milliseconds and an analysis window of 32 milliseconds.

Different recognition accuracy may be obtained using different feature sets. These feature sets may include static features and dynamic features separately and combined. To illustrate the robustness of the parameterization used in the invention, clean as well as filtered data were used. To obtain filtered data for the test set in the presently preferred embodiment, a distorting filter is used and the test data is filtered to artificially create a mismatch between the training set and the test set. In this regard, see H. Murveit, J. Butzberger and M. Weintraub. In Darpa *Workshop Speech and Natural Language*, pages 280–284, February 1992.

Figure 4:
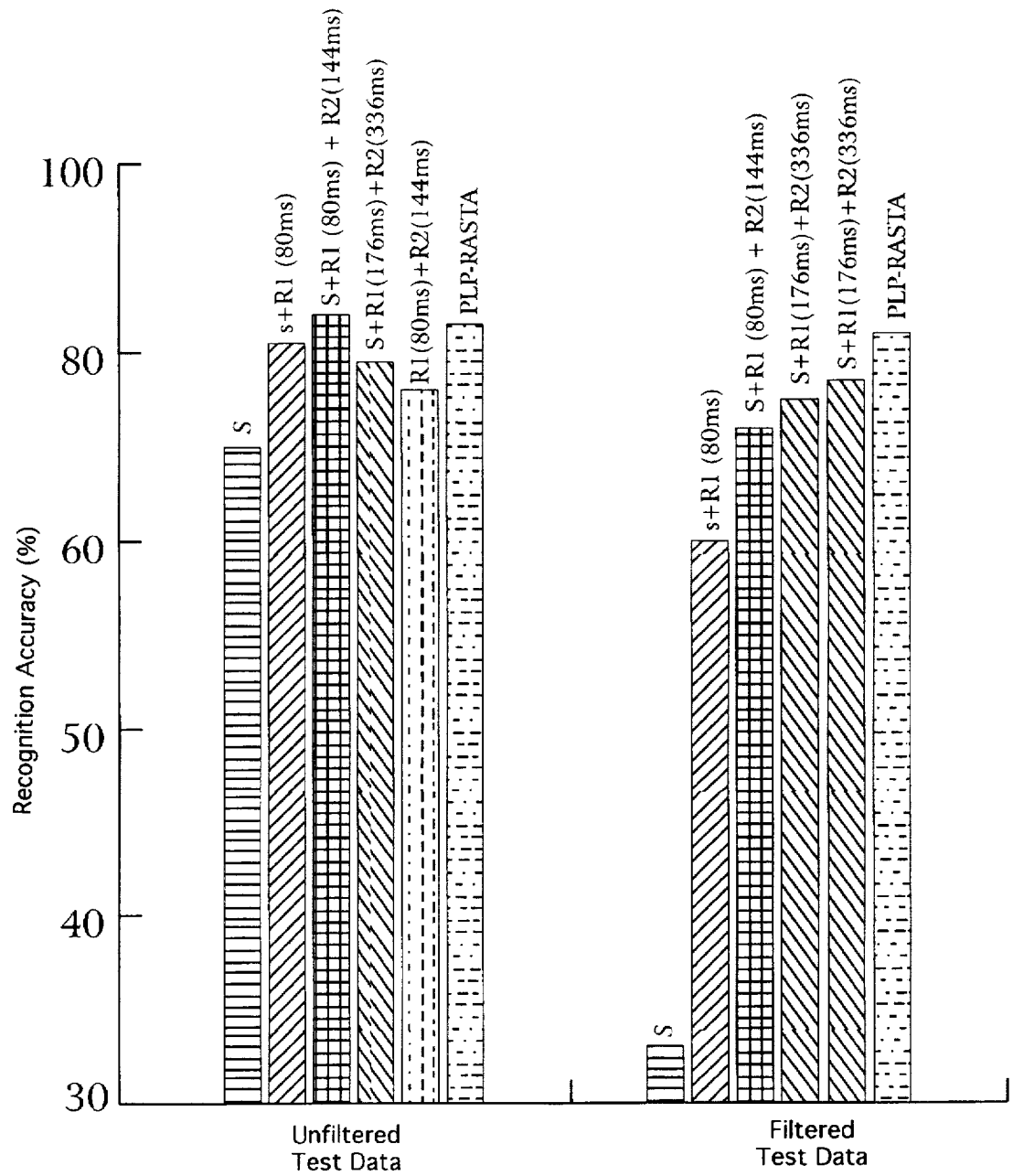
FIG. 4 is a bar graph comparing recognition accurancy obtained using different feature sets.

FIG. 4 compares the recognition accuracy obtained with different feature sets for both unfiltered test data and filtered test data. In FIG. 4 the symbol S stands for static coefficients and the symbols R1 and R2 stand for the 1st-order and 2nd-order regression coefficients, respectively. The data of FIG. 4 show that including a second derivative does slightly improve recognition accuracy for unfiltered speech. The data also show that both PLP-RASTA and the combination of MFCC first and second derivatives (R1+R2) successfully handle the mismatch between training and testing; however, R1+R2, alone, decreases the recognition accuracy for the unfiltered data. The data also show that static coefficients, by themselves, are not robust against a mismatch between training and testing conditions. Finally, long regression windows for the first and second derivatives decrease the recognition accuracy (for our database the average letter duration is 386 milliseconds [ms]). Additional experiments for other window sizes confirm this observation (e.g. R1 [112 ms] and R2 [208 ms]). This result is in agreement with C. Nadeu and B-H. Juang in ICSLP '94, pages 1927–1930, 1994. Long regression windows may not be desirable for continuous speech recognitions systems.

One advantage of the PLP-RASTA process adopted by the presently preferred embodiment is that the bandpass filtering included in PLP-RASTA explicitly compensates for channel distortion. However, we believe that some kind of multistyle training (multienvironment training) is happening because of the diversity and the size of our database. In the case of MFCC analysis, multistyle training also compensates for the channel distortions. Because the present invention is intended principally for real time implementation, the combination of long term cepstral subtraction with MFCC analysis has not been included, although this could improve accuracy. A short term cepstral subtraction may constitute an alternative.

Returning to FIG. 1, connected to speech analysis module 14 is a loosely constrained speech recognizer 26. The speech recognizer works in conjunction with a predefined letter grammar that may be suitably stored in a database. The presently preferred letter grammar is a stochastic grammar, namely bigram letter grammar 28. The invention can be practiced using other letter grammars, such as a trigram grammar or larger. In general, letter grammar 28 may be considered an n-gram letter grammar, where n is an integer greater than 1.

The bigram letter grammar is essentially a database of pairs of letters and an associated probability that one letter follows another. By way of example, the letters J and O have a higher probability of following one another (e.g. JOHNSON) than the letters J and X. The letter grammar is computed on the training set labels and is used by the speech recognizer in decoding the spoken utterances into letter hypotheses.

The presently preferred speech recognizer 26 is a frame synchronous, 1st-order, continuous density, hidden Markov model recognizer. The recognizer employs a Viterbi decoder available as a component of the HTK hidden Markov Model Tool Kit available from University of Cambridge, Department of Engineering, Trumpington Street, Cambridge, CB2 1PZ, United Kingdom. The presently preferred embodiment was developed using Version 1.4 of the HTK Tool Kit.

The presently preferred embodiment employs a modified Viterbi decoder that yields the N-best hypotheses (instead of a single hypothesis). The Viterbi decoder of the HTK Tool Kit is designed to provide only the best hypothesis, based on probability of a match between HMM models and the test utterance. This standard Viterbi decoder is modified for use in the invention so that it provides the N-best hypotheses, based on the highest probabilities of a matches between HMM models and the test utterance. The symbol N may be any integer greater than 1. The precise value Chosen for integer N may depend on the speed of the processor and on the memory size. The presently preferred embodiment uses a value of 20 for N.

Figure 5:
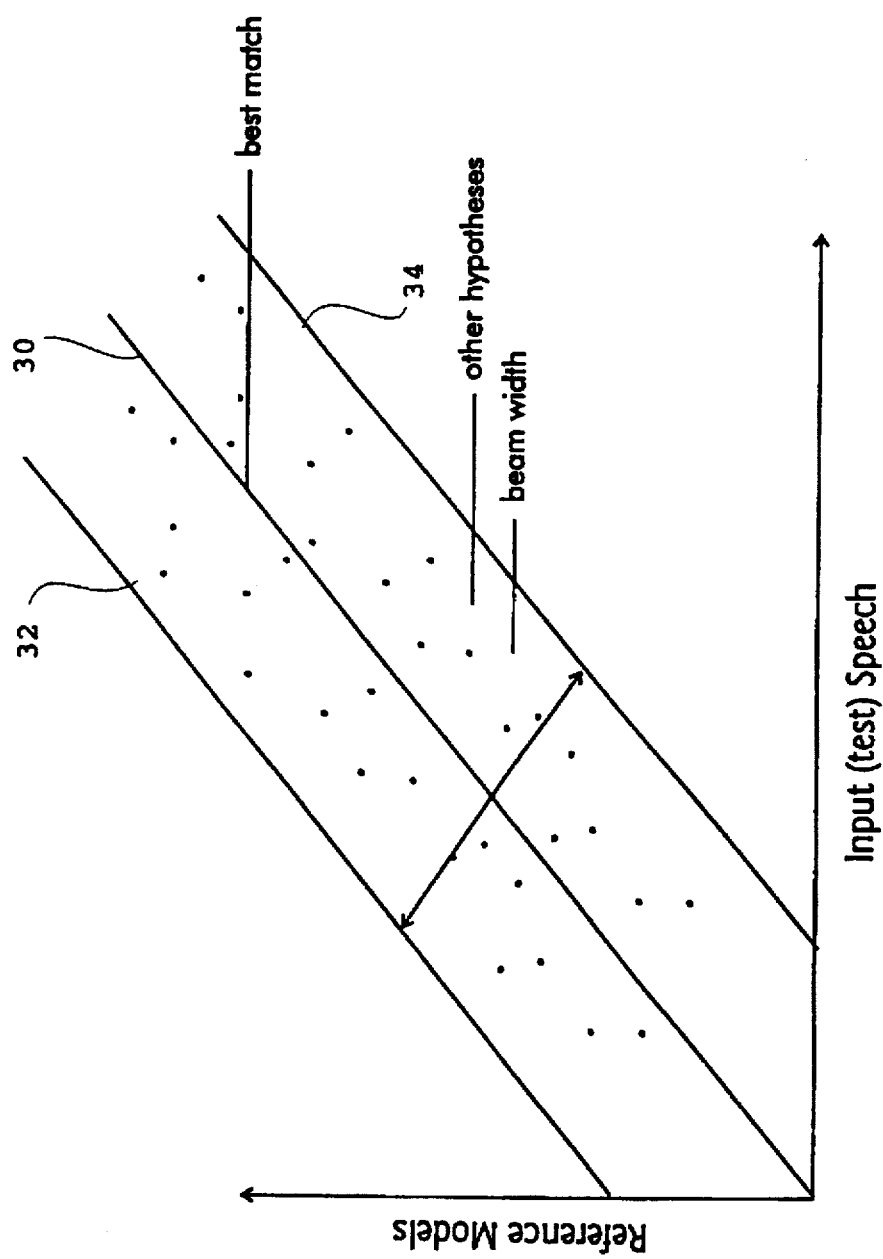
FIG. 5 is a graph depicting the beam search principle employed by the hidden Markov model recognizer.

The hidden Markov model recognizer employed at 26 is provided with a beam search capability designed to limit the search space, so that the recognizer will process the incoming speech more quickly. To illustrate the beam search principle, refer to FIG. 5. FIG. 5 illustrates the search space examined by the decoder when comparing the input speech (test data) with the reference speech or reference template. In FIG. 5 the input speech is plotted along the i axis and the reference speech is plotted along the j axis. The hidden Markov model recognizer produces a score that represents the likelihood of a match between input speech and reference speech. Without the beam search mechanism, the recognizer must keep and compute all the matching possibilities between the test utterance and the HMM models. With beam search the recognizer considers only those scores that deviate from the best score plus or minus an amount equal to the beam width.

Rather than searching the entire search space, a beam search is implemented whereby the least likely search paths are pruned, such that only the best hypotheses are returned. In FIG. 5 the beam search is constrained between lines 32 and 34.

The N-best candidates are chosen using an N-best algorithm. For details regarding this technique, see R. Schwartz and Steve Austin, "Efficient, High Performance Algorithms for N-Best Search," DARPA Workshop on Speech Recognition, pp. 6–11, 1990. In speech recognition, the incoming speech data is broken up into time frames and analyzed on a frame by frame basis. For any given utterance, there may be several possible hypotheses. The presently preferred N-best algorithm selects the best starting time for a letter based only on the preceding letter and not on letters before the preceding letter. As each letter is spoken and analyzed, the hidden Markov model recognizer will generate probability scores for each of the models. Because the objective of the system is ultimately to select the most probable sequence of letters, the system stores a plurality of paths, representing possible spelled combinations of letters. To make the system work better as a real time recognizer, two different levels of data pruning are implemented. The pruning technique at both levels involves comparing the probability of a given hypothesis to a probability threshold. If the probability of a given path is below the threshold, it is discarded. More specifically, pruning occurs at a local level and at a global level. Local level pruning involves discarding those paths that represent low probability matches on the letter level; and global pruning involves discarding those paths that represent low probability matches from the beginning of the utterance to the last letter found. Thus, at the end of the spelled name, a recursive traceback is performed to extract the N-best name hypotheses. When the traceback operation is performed, the local and global pruning has already reduced the size of the memory space that needs to be analyzed.

In addition to local and global pruning, the presently preferred system also uses an adaptive threshold whereby the pruning threshold is adjusted dynamically as the system runs. The adaptive threshold adjustment is illustrated in FIG. 6.

Figure 6:
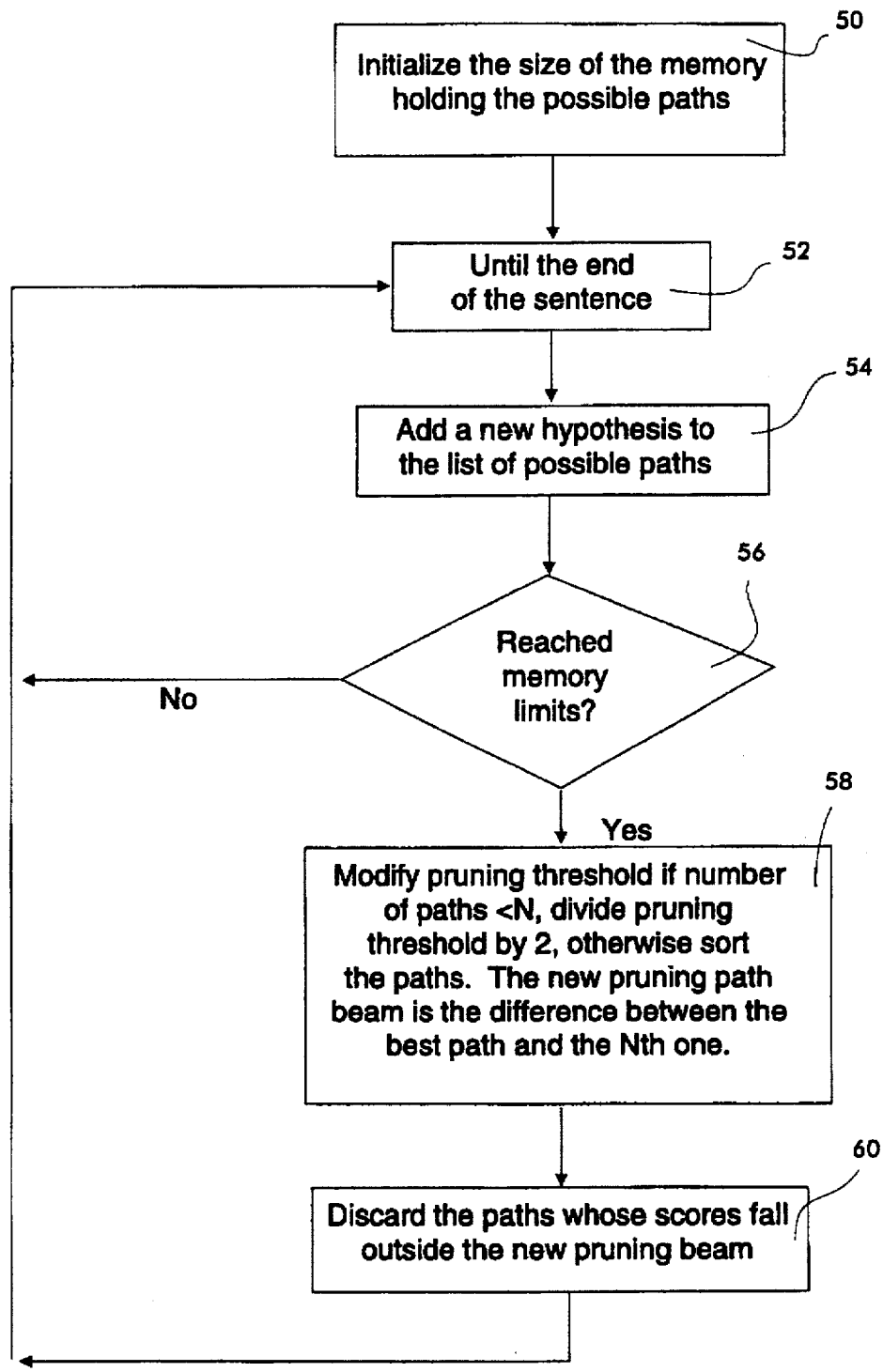
FIG. 6 is a flowchart showing the adaptive path pruning process used in the preferred embodiment.

FIG. 6 shows the preferred adaptive path pruning procedure implemented by the present system. Referring to FIG. 6, at step 50 the procedure initializes the size of memory that will hold the possible paths that may be followed by the recognizer as it searches the search space. Until the end of the sentence or input utterance is reached (step 52) a new hypothesis is added to the list of possible paths (step 54). This procedure repeats until the memory limit is reached at step 56. Once the memory limit is reached, the pruning threshold is modified. If the number of paths is less than N (the N-best integer) the pruning theshold is divided by 2. Otherwise, the paths are sorted and a new pruning path beam is established as the difference between the best path and the Nth one. Thereafter (step 60) paths whose scores fall outside the new pruning beam are discarded. The beam search is implemented to eliminate from consideration those hypotheses that fall outside the region of the beam delimited by lines 32 and 34. This decreases the number of paths that must be processed by the decoder, making the recognizer operate more efficiently. If desired, the path pruning threshold can be made adaptive, altering the threshold based on the results of each match attempt. In addition, a local word pruning technique is used that eliminates theories whose last letter probability does not score well as compared to the best last letter probability.

In the case of confusable words, the recognizer uses state tying to help focus on the discriminative part of the word and to decrease the number of estimated parameters. The tied letters are (m, n), (i, r), (p, t) and (b, d). In the presently preferred embodiment all letters except the letter W are represented by a 6 state HMM model. The letter W is represented by a 12 state HMM model and the silence model is represented by 1 state. Letter models have different numbers of Gaussian mixtures, depending on how confusable the letters are. The "E-set" letters: b, c, d, e, g, p, t, v and z, as well as the letters m, n, s and f are all modeled with 6 mixture densities. The remaining letters are modeled with 3 mixture densities.

If desired, the system may also include a neural network discriminator to refine the output of the speech recognizer. In FIG. 1 a neural network discriminator 36 is connected to the output of recognizer 26. In the alternative the neural network discriminator may be alternately attached, or additionally attached to the highly constrained recognizer 44. The highly constrained recognizer is discussed more fully below.

The function of neural network discriminator 36 is to distinguish between confusable letters (such as the letters J and K). The neural network is applied to confusable subsets. The first pass of the HMM recognizer produces a sequence of letters (one sequence for each of the N-best). If one of these letters belongs to a confusable subset, the neural network discriminator is launched on the segment between the beginning and ending boundaries for this letter—as given by the HMM recognizer on its first pass. (See Appendix for example). The neural network discriminator first measures the energy in each utterance to find the maximum energy. The maximum energy corresponds to the vowel part of each letter. Then, the neural network discriminator focuses on data that precedes or follows (in time) the vowel portion of each utterance. It is in these regions that fricatives, affricates, plosives and nasals are produced that provide the primary distinguishing features between confusable letters. In the presently preferred embodiment two frames of cepstral coefficients are extracted from these regions and concatenated. The concatenated coefficients are then used as inputs to the neural network.

The neural network is selectively trained, providing weights for different confusable letters. Thus, when each of the N-best hypotheses are presented to the neural network discriminator, the discriminator examines each, based on nonvowel coefficients. The neural network discriminator, itself, produces an output comprising the N-best hypotheses, based on the highest probabilities of match using the neural network weights to discriminate between confusable letters. The neural network discriminator is only applied on the confusable subsets (e.g. the letters M and N).

To better understand the neural network discriminator, refer first to FIGS. 7A and 7B. In FIG. 7A the global method of analyzing the utterance using a hidden Markov model is illustrated. By way of comparison, FIG. 7B shows the neural network disciminator technique. In FIG. 7B, two frames 100 and 110 are identified as representing the data that precedes or follows the vowel portion of the utterance. In this case, the data precedes the vowel portion 120 the cepstral coefficients of these two frames 100 and 110 are then assigned as inputs to the neural network, as illustrated. In FIG. 7B, the neural network inputs are depicted at 130 and 140. The hidden layer of the neural network is depicted at 150 and the output at 160. The neural network trains on this data to provide improved recognition accuracy for the confusable letters.

Figure 8:
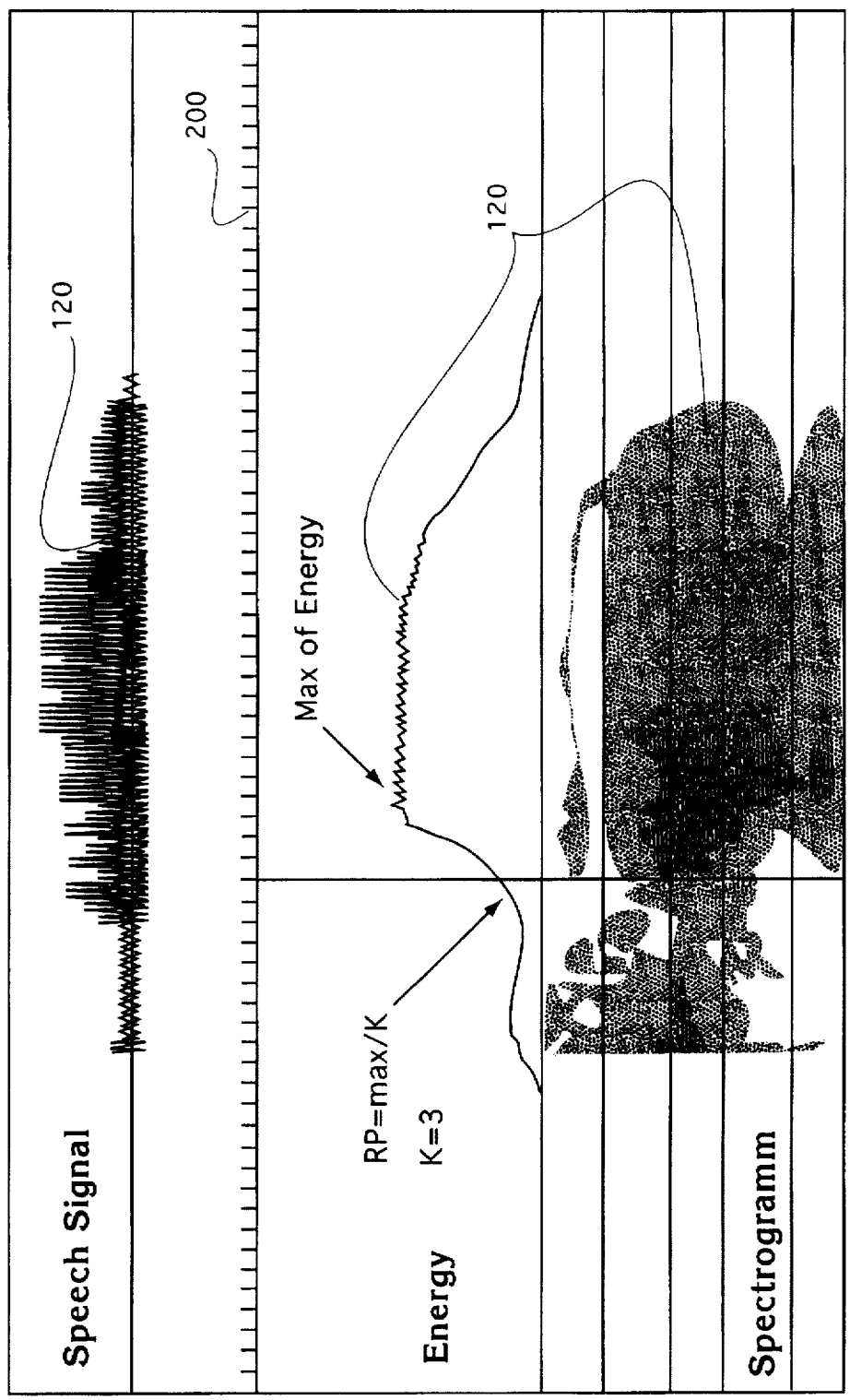
FIG. 8 is a chart showing the speech signal, energy and spectrogram for an example utterance, illustrating the discriminative analyzing technique.
Figure 9:
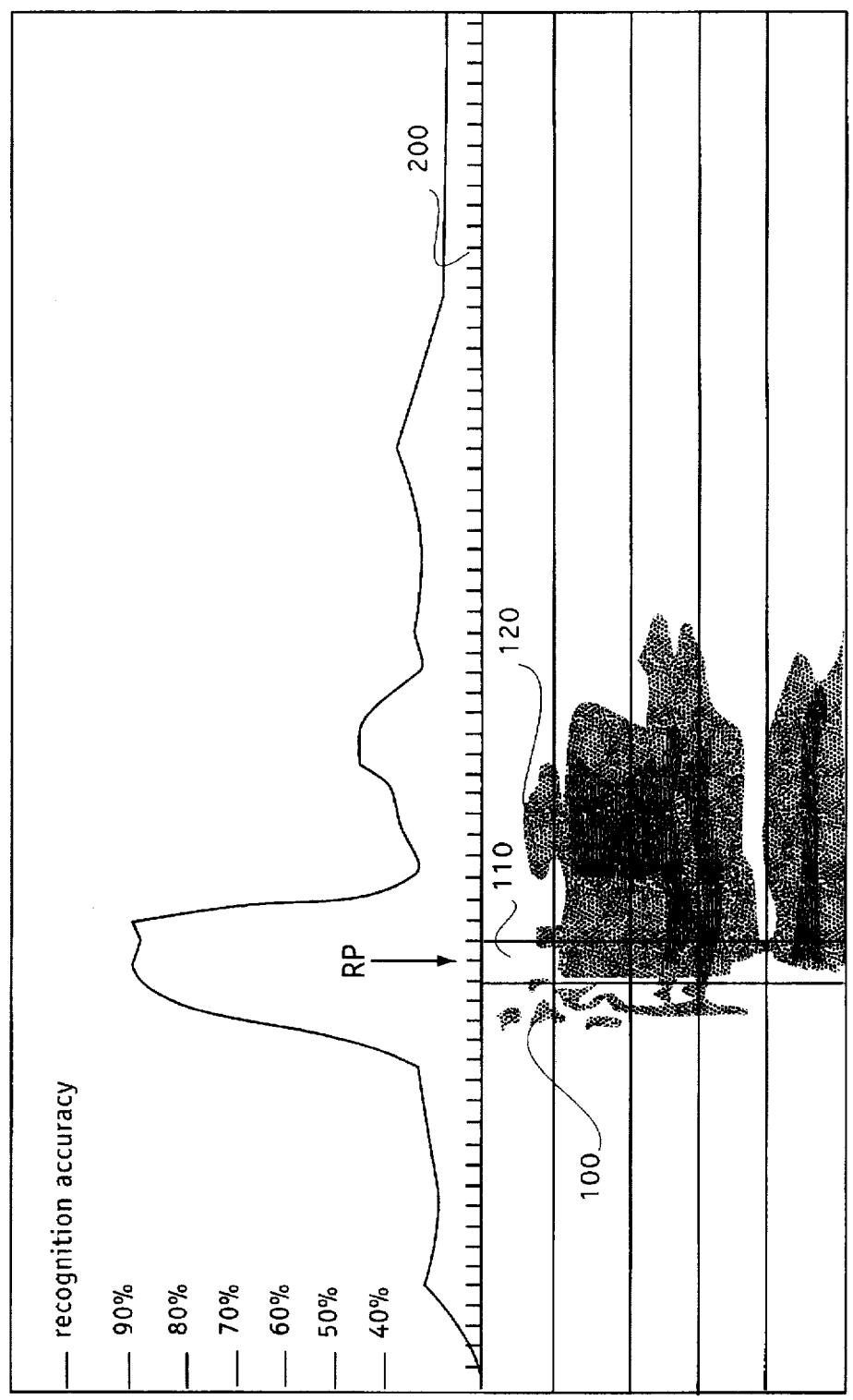
FIG. 9 is a graph showing the selection of two frames for the [A,j,K] subset (frames left and right of the reference point RP)

FIG. 8 shows how the speech signal changes in energy content from time frame to time frame. In FIG. 8, the time frames have been illustrated at 200. FIG. 8 also includes a spectrogram of the speech signal for comparison purposes. Illustrating that the recognition accuracy may be significantly improved by focusing on the region that precedes or follows the vowel portion of the utterance, see FIG. 9. In FIG. 9 two frames for the [A, J, K] subset are illustrated, one frame preceding and one frame following reference point RP. Note that recognition accuracy is quite high in the regions that precede the vowel portion 120.

The N-best hypotheses resulting from the recognizer 26 (or from the neural network discriminator 36, if used) are then passed to dynamic time warping (DTW) alignment module 38. The dynamic time warping alignment module has an associated name dictionary 39 against which the N-best hypotheses are compared. Dynamic time warping is used to account for insertion, substitution and deletion errors.

In some instances, the result of dynamic time warp alignment will produce a single name with no other candidates. Decision strategy module 40 detects this and provides the recognized name as the output, when there is only one candidate resulting from the DTW alignment. In most cases, however, a single candidate does not result, in which case the decision strategy module passes the N-best hypotheses to module 42 for building a dynamic grammar.

Module 42 builds a grammar using the N-best candidates provided by the DTW alignment module. The highly constrained recognizer 44 is then invoked to evaluate the N-best candidates using the dynamic grammar 42. The recognizer 44 may also be a hidden Markov model recognizer. Even though highly constrained, the data pass through this recognizer is not time-consuming because the dynamic grammar is small and because the parametric representation (computed in 14) need not be recomputed. As noted above, if desired, the neural network discriminator can be applied at the output of recognizer 44.

Figure 10:
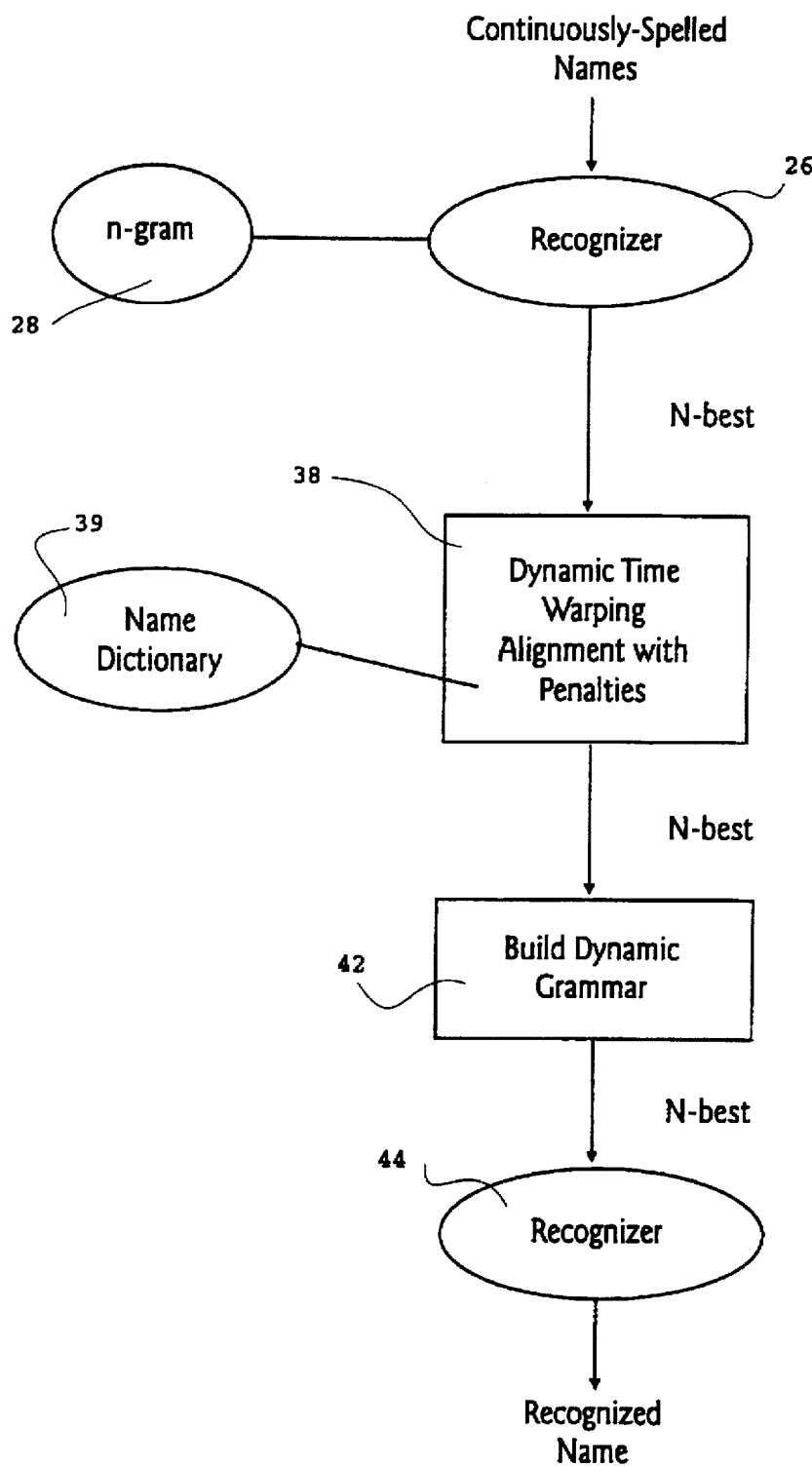
FIG. 10 is a data flow diagram illustrating how the invention propagates the N-best hypothesis through several processing steps.

By way of summary, FIG. 10 shows the manner in which continuously spelled names may be recognized in real time by propagating the N-best hypotheses through several processing stages. The continuously spelled names are input to the recognizer 26, which applies a loosely constrained recognizing process using the n-gram letter grammar 28. Recognizer 26 picks out the N-best hypotheses and passes these to the dynamic time warping (DTW) alignment process 38. The alignment process compares the N-best hypotheses with the name dictionary 39, selecting the N-best hypotheses.

The N-best hypotheses selected by the DTW module are then used in process 42 to build a dynamic grammar and the N-best hypotheses are then supplied to highly constrained recognizer 44 along with the dynamic grammar 42. The highly constrained recognizer then selects one of the N-best hypotheses (the best one) as the recognized name. If desired, neural network discrimination can be performed on the N-best hypotheses produced by either or both of the recognizers, recognizer 26 and recognizer 44. While these two recognizers have been separately illustrated in FIG. 10 to better show the data flow, a working implementation may require only a single recognizer that is simply used twice during the processing (once to provide the function of recognizer 26 and twice to perform the function of recognizer 44).

Table I shows the results obtained using the system of the invention. In the Table, different dictionary sizes are listed.

TABLE I

| Size Of Dictionary | Average Confusability | Name Recognition Rates After Alignment 38 | Name Recognition Rates After Recognizer 44 |
| --- | --- | --- | --- |
| 491 | 0.07 | 97.0% | 98.4% |
| 3,388 | 0.5 | 90.6% | 95.3% |
| 21,877 | 1.8 | 87.0% | 90.4% |

In the above Table the average confusability index is the number of names that differ by only one letter, averaged for the entire dictionary.

The listing in the Appendix shows how the system of the invention performs in recognizing the spelled name JOHNSON. In the listing the section designated [First Pass] shows two hypotheses, (1): CKOHAHON and (2): CKOHASON. Neither of these is the name JOHNSON.

In the section labeled [DTW Alignment] the top 10 candidates have been listed included in the list is the name JOHNSON (candidate 7 of 10). Note that some of the other names achieved higher scores than the name JOHNSON in this pass.

In the section labeled [Costly Constrained Pass] the input utterance is compared with only the candidated selected during DTW Alignment in this case, the recognizer correctly detects the name JOHNSON.

From the foregoing it will be appreciated that the present invention provides a high accuracy rate in the recognition of continuously spelled names. By reserving the highly constrained (high detail) recognizer for the 4th pass, the system can recognize continuously spelled names without a great deal of computational overhead. This makes the invention suitable for use in mass-produced consumer products and telephone directory lookup applications.

While the invention has been described in its presently preferred form, it will be understood that modifications can be made without departing from the spirit of the invention as set forth in the appended claims.

APPENDIX

```
Speech was found
End of Speech at frame 286
Recognition done. Parsing PLR lattice ...
2 tokens collected from 1 models, 0 redundant, 2 kept
HViteFS.WdDependent.Align.Phone: WARNING Only 2 tokens survved
to end of input for AudioInput.loop
1000002100000     c
21000005200000    k
52000008500000    o
850000012600000   h
126000001700000   a       [First Pass]
1700000020800000  h
2080000023300000  o
2330000027700000  n
    Hypothese number 1 : ckohahon, Prob per frame = 27.441595
1000002100000     c
21000005200000    k
52000008500000    o
850000012600000   h
126000016900000   a
169000020600000   s
206000023300000   o
233000027700000   n
    Hypothese number 2 : ckohason, Prob per frame = 27.433636
Total Pruning = 59.36%
Max PLRs Used = 400
596 = size of PC_dict
candidate 1 of 10   =   thomason    Score=14
candidate 2 of 10   =   thompson    Score=22
candidate 3 of 10   =   thomson     Score=26
candidate 4 of 10   =   thorson     Score=26
candidate 5 of 10   =   shoulson    Score=27   [DTW Alignment]
candidate 6 of 10   =   davidson    Score=28
candidate 7 of 10   =   johnson     Score=28
candidate 8 of 10   =   dodson      Score=30
candidate 9 of 10   =   carlson     Score=31
candidate 10 of 10  =   knudson     Score=31
Loading new network     /user/tmp/aaaa00794 ...
84 Instances Created of 29 HMMs
****************************
***    Final Decision !   ***
****************************
Recognition done. Parsing PLR lattice ...
1 tokens collected from 1 models, 0 redundant, 1 kept
HViteFS.WdDependent.Align.Phone: WARNING Only 1 tokens survived
to end of input for AudioInput.dyn
9000005300000     j
53000008500000    o
850000012600000   h       [Costly-Constrained
126000016900000   n        Pass]
169000020600000   s
206000023300000   o
233000002700000   n
    Hypothese number 1 : Johnson, Prob per frame = 27.920572
Total Pruning = 81.96%
Max PLRs Used = 625
***********************************************
Total time used for this sentence
Speech length: 2.870 seconds
Real time: 3.688 seconds
User time: 1.833 seconds
Syst time: 0.000 seconds
***********************************************
```

What is claimed is:

1. A method for recognizing continuously spelled names input as a sequence of letters uttered into a microphonic transducer comprising:

providing a predetermined letter grammar, defining a plurality of groups of letters;

processing said sequence of letters through a speech recognizer using said letter grammar to produce a first list comprising a plurality of groups of letters representing a set of N-best letter sequence hypotheses, where N is an integer greater than one;

providing a name dictionary comprising a first plurality of names representing possible choices of said continuously spelled names;

performing alignment between said first list and said name dictionary and selecting a second plurality of names from said name dictionary that represents the N-best name candidates;

building a dynamic grammar using said second plurality of names selected in said alignment step;

processing said sequence of letters through a speech recognizer using said dynamic grammar to select one name from said second plurality of names as representing a best hypothesis for the continuously spelled name.

2. The method of claim 1 wherein said letters of said letter grammar are represented by a sequence of states and wherein said step of providing a predetermined letter grammar further including the step of:

tying states of at least a portion of said letters of said letter grammar.

3. The method of claim 1 wherein said step of processing said sequence of letters through a speech recognizer using said letter grammar further includes the step of:

storing groups of letters representing possible letter sequences as a plurality of paths; and applying an adaptive path pruning threshold to decrease the number of paths needed to produce said first list.

4. The method of claim 1 wherein said step of processing said sequence of letters through a speech recognizer using said dynamic grammar further includes the step of:

storing groups of letters representing possible letter sequences as a plurality of paths; and applying an adaptive path pruning threshold to decrease the number of paths needed to select one from said second plurality of names representing the best hypothesis for the continuously spelled name.

5. The method of claim 1 wherein said step of processing said sequence of letters through a speech recognizer using said letter grammar further includes the step of:

using said speech recognizer to generate probability scores for each of said group of letters:

storing the highest probability score;

performing a local word pruning to eliminate groups of letters whose probability score is lower than said highest probability score.

6. The method of claim 1 wherein said step of processing said sequence of letters through a speech recognizer using said dynamic grammar further includes the step of:

using said speech recognizer to generate probability scores for each of said group of letters;

storing the highest probability score:

performing a local word pruning to eliminate groups of letters whose probability score is lower than said highest probability score probability score.

7. The method of claim 1 wherein said step of processing said sequence of letters through a speech recognizer using said letter grammar further includes the step of:

performing a hidden Markov model process with beam search to process said sequence of letters through a speech recognizer.

8. The method of claim 1 wherein said step of processing said sequence of letters through a speech recognizer using said dynamic grammar further includes the step of:

performing a hidden Markov model process with beam search to process said sequence of letters through a speech recognizer.

9. The method of claim 1 wherein said step of performing alignment includes the step of:

performing a dynamic time warping process to compare said first list to said name dictionary.

10. The method of claim 1 further comprising the step of:

processing said sequence of letters through a neural network discrimination process to produce a second list comprising a plurality of groups of letters representing a second set of N-best hypotheses, where N is greater than one.

11. The method of claim 10 wherein said neural network uses two frames to perform the discrimination.

12. An apparatus for recognizing continuously spelled names input as a sequence of letters uttered into a microphonic transducer, comprising:

a first speech recognizer for processing said sequence of letters to produce a first list comprising a plurality of groups of letters representing a set of N-Best letter sequence hypotheses where N is an integer greater than one;

a name dictionary for representing possible choices of said continuously spelled names;

alignment means coupled to said first speech recognizer and said name dictionary for performing alignment between said first list and said name dictionary and selecting a first plurality of names from said name dictionary that represents the N-best name candidates;

a dynamic grammar storage coupled to said alignment means for storing said first plurality of names; and a second speech recognizer coupled to said dynamic grammar storage for processing said sequence of letters to select one candidate from said first plurality of names as representing a best hypothesis for the continuously spelled name.

* * * * *